United States Patent [19]
Bookshar

[11] Patent Number: 5,505,676
[45] Date of Patent: Apr. 9, 1996

[54] CLUTCH TORQUE CONTROL

[75] Inventor: Duane R. Bookshar, Highland Heights, Ohio

[73] Assignee: The Stanley Works, New Britain, Conn.

[21] Appl. No.: 186,287

[22] Filed: Jan. 25, 1994

[51] Int. Cl.$^6$ .................................................... B60K 41/02
[52] U.S. Cl. .................. 477/178; 192/56.57; 192/56.62; 173/178; 81/475
[58] Field of Search .................. 192/56 R, 150; 173/178; 81/475; 477/178

[56] References Cited

U.S. PATENT DOCUMENTS

| | | | |
|---|---|---|---|
| 4,019,589 | 4/1977 | Wallace | 173/178 |
| 4,049,104 | 9/1977 | Webb | 192/150 |
| 4,071,092 | 1/1978 | Wallace | 173/178 |
| 4,078,618 | 3/1978 | DePagter et al. | 173/12 |
| 4,088,197 | 5/1978 | Roll et al. | 173/178 |
| 4,154,308 | 5/1979 | Goldsberry et al. | 173/12 |
| 4,631,992 | 12/1986 | Eckman | 81/470 |
| 4,655,103 | 4/1987 | Schreiber et al. | 192/56 R X |
| 4,712,456 | 12/1987 | Yuan | 173/178 X |
| 4,823,885 | 4/1989 | Okumura | 173/178 |
| 4,834,192 | 5/1989 | Hansson | 173/178 |
| 5,005,682 | 4/1991 | Young et al. | 173/178 X |
| 5,060,771 | 10/1991 | Robinson | 192/0.034 |
| 5,156,244 | 10/1992 | Pyles et al. | 173/178 X |
| 5,209,308 | 5/1993 | Sasaki | 173/178 |
| 5,310,010 | 5/1994 | Lo | 173/178 |

FOREIGN PATENT DOCUMENTS

| | | |
|---|---|---|
| 1197393 | 7/1970 | United Kingdom . |
| 1289056 | 9/1972 | United Kingdom . |

Primary Examiner—Andrea L. Pitts
Attorney, Agent, or Firm—Hayes & Reinsmith

[57] ABSTRACT

A clutch torque control features a plurality of clutch balls disposed between complementary races of input and output cams which are relatively axially displaceable upon the input cam rolling the clutch balls between matching cam peaks responsive to a drive output reaching a predetermined output torque.

11 Claims, 10 Drawing Sheets

CLUTCH TORQUE CONTROL

FIELD OF THE INVENTION

This invention generally relates to rotary power tools and particularly concerns a clutch torque control for controlling applied torque, e.g., to a fastener and limiting any resulting force impulse to a tool operator.

BACKGROUND OF THE INVENTION

Known clutch torque controls exhibit certain disadvantages and among these disadvantages is the application to a fastener of undesired dynamic torque output which is different from that preset for a given job. Such results are obtained frequently in connection with known fastener setting power tools utilizing clutch mechanisms, many of which are provided with spring and cam arrangements and which feature sliding friction on torque transmitting components.

Figure 1:
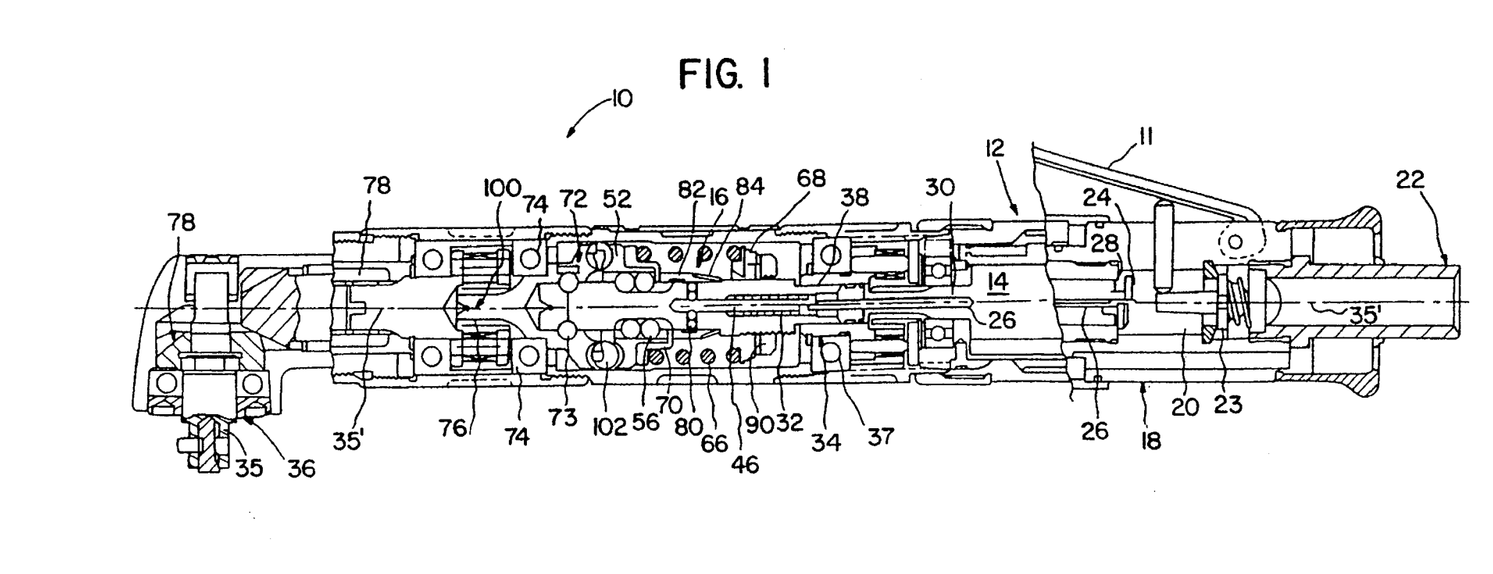
FIG. 1 is a side view, partly in section and partly broken away, of a power tool incorporating this invention.
Figure 1A:
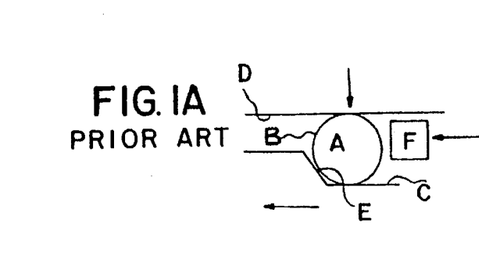
FIG. 1A is a schematic view of a prior art clutch.

More specifically, a typical prior art clutch is schematically illustrated in FIG. 1A wherein a rolling element, specifically ball B, is forced against a clutch surface C by a flat upper clutch surface D. Ball B is pushed over cam E by a flat driving element F. As ball B moves over cam E, the clutch disengages and triggers a mechanism, not shown. Both the flat upper clutch surface D and the flat driving element F slide relative to ball B. This sliding action results in dynamic frictional loading which eventually is likely to cause undesired inconsistency and wear in a rotary power tool were the clutch incorporated in such a tool.

Such sliding friction on the torque transmitting components may in fact change the torque actually being transmitted because sliding action translates into dynamic friction in contrast to rolling friction. Rolling friction between relatively movable parts is much more consistent because such component parts do not slide relative to one another, particularly when maximum torque is being transmitted such as by relatively moving clutch parts.

SUMMARY OF THE INVENTION

The above disadvantages have been overcome in a clutch torque control of this invention which utilizes a unique ball and cam arrangement for transmitting torque to an output cam through a plurality of clutch balls in a rolling action and which is particularly designed to transmit a preset torque which, when exceeded, effects repeatedly reliable clutch release while assuring that there is no undesired effect on the set torque of the clutch, due to cam wear, and to minimize any transmission of torque reaction impulse to an operator of a tool incorporating this invention. Moreover, the clutch torque control of the present invention may be incorporated in different types of rotary power tools having a variety of applications. The invention is suitable to be incorporated in electric rotary power tools as well as in fluid operated tools such as screwdrivers, nutsetters and the like wherein a durable and readily adjustable tool is required for delivering a preset torque applied to a fastener by the tool during its operation over hundreds of thousands of operating cycles under demanding conditions with highly reliable results.

Accordingly, a primary object of this invention is to provide a new and improved clutch torque control which effects minimal sliding friction on torque transmitting components of that control.

Another object of this invention is to provide such a new and improved clutch torque control which features accuracy in the control of torque in a highly durable device utilizing a minimum number of different parts relatively economical to manufacture and assemble and which are particularly designed to afford quick and easy adjustment while minimizing any service requirements because of significantly reduced wear on the torque transmitting components.

Yet another object of this invention is to provide such a new and improved clutch torque control which is readily incorporated in both fluid operated power tools and electric power tools for effective transmission of torque from a rotary input to a rotary output while readily providing actuation of a shut-off mechanism of such tools.

In summary, the present invention provides a clutch torque control wherein driving and driven clutch parts include input and output cams each having complementary annular races in confronting relation to one another, the races of the cams including a like plurality of equally circumferentially spaced lobes. A clutch ball is disposed within the races between adjacent pairs of lobes, the clutch balls cooperating with the lobes for normally establishing a releasable drive between the drive input and drive output and providing relative rotational movement between the driving and driven clutch parts at a preset output torque. The lobes each have sloping cam ramps rising to a peak. The lobes are dimensioned and configured with profiles such that the lobes of the input cam are engageable with the clutch balls for rolling them simultaneously between matching cam peaks responsive to relative rotation of the clutch parts to axially displace them relative to one another to release the drive therebetween and to actuate a shut-off mechanism responsive to the drive output reaching said preset output torque.

The foregoing and additional advantages and characterizing features of the present invention will become clearly apparent upon a reading of the ensuing detailed description together with the included drawing wherein:

BRIEF DESCRIPTION OF THE DRAWING FIGURES

FIGS. 4a and 4b through 9a and 9b are schematic diagrams of different sequences of an operating cycle of a tool incorporating the clutch torque control of this invention;

DETAILED DESCRIPTION OF AN ILLUSTRATED EMBODIMENT

Referring to the drawing figures in detail, a power tool 10 is shown having a motor 12 which, in the illustrated embodiment, is shown as an air motor which will be understood to be a reversible air motor connected to a suitable source of compressed air, not shown, for rotating vanes such as at 14 in a selected angular direction as determined by an appropriate reversing valve, not shown, and associated flow passages, the details of which are not necessary for an understanding of this invention.

Figure 2:
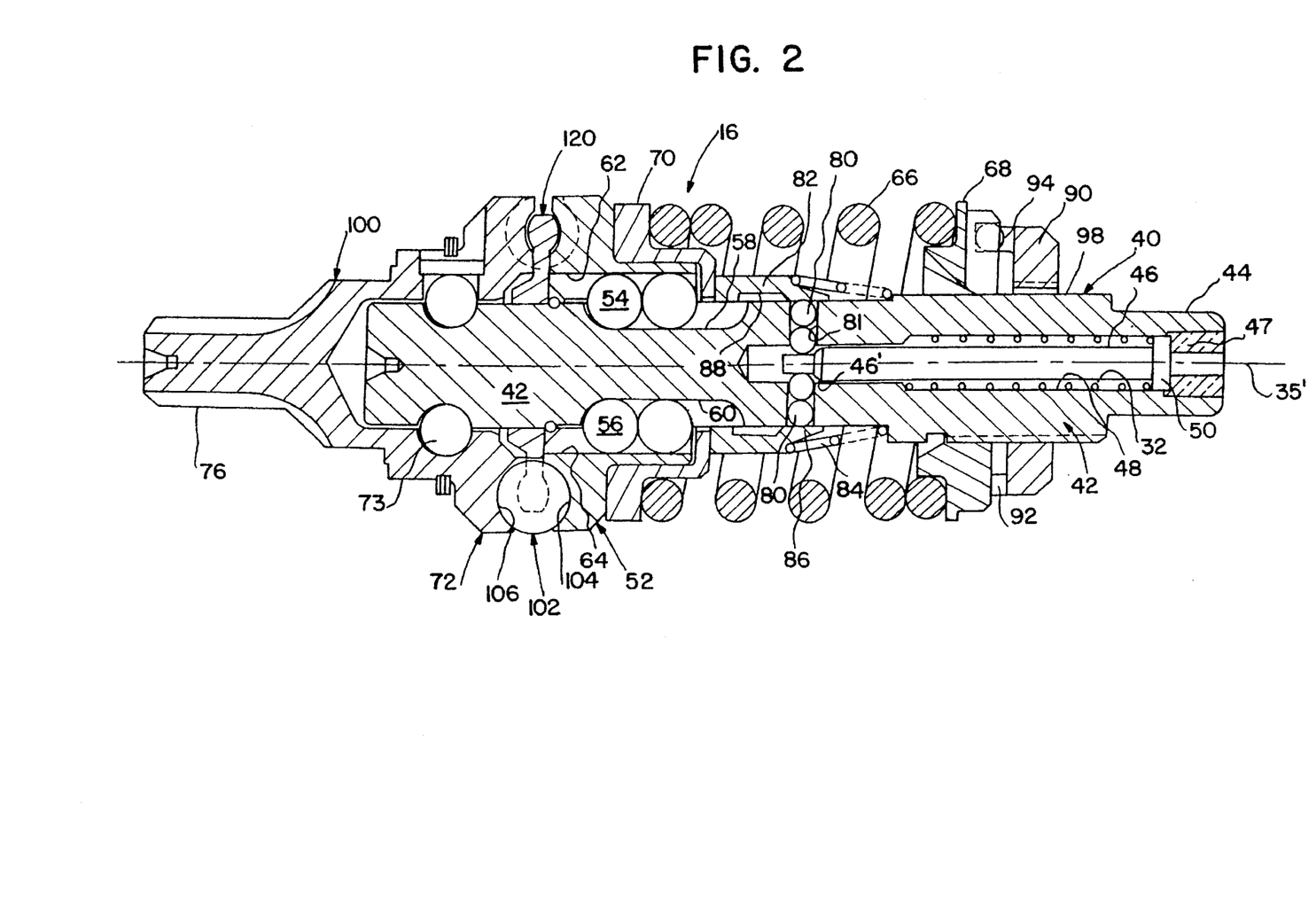
FIG. 2 is an enlarged sectional side view of a clutch torque control of this invention incorporated in the tool of FIG. 1.

This invention is directed to a clutch torque control 16 which is best seen in FIG. 2 and is fully described in detail below for use in not only an air tool of the type illustrated but also in other tools such as electric power tools for a variety of applications in setting fasteners such as in power screwdrivers, nutsetters and the like.

Figure 3:
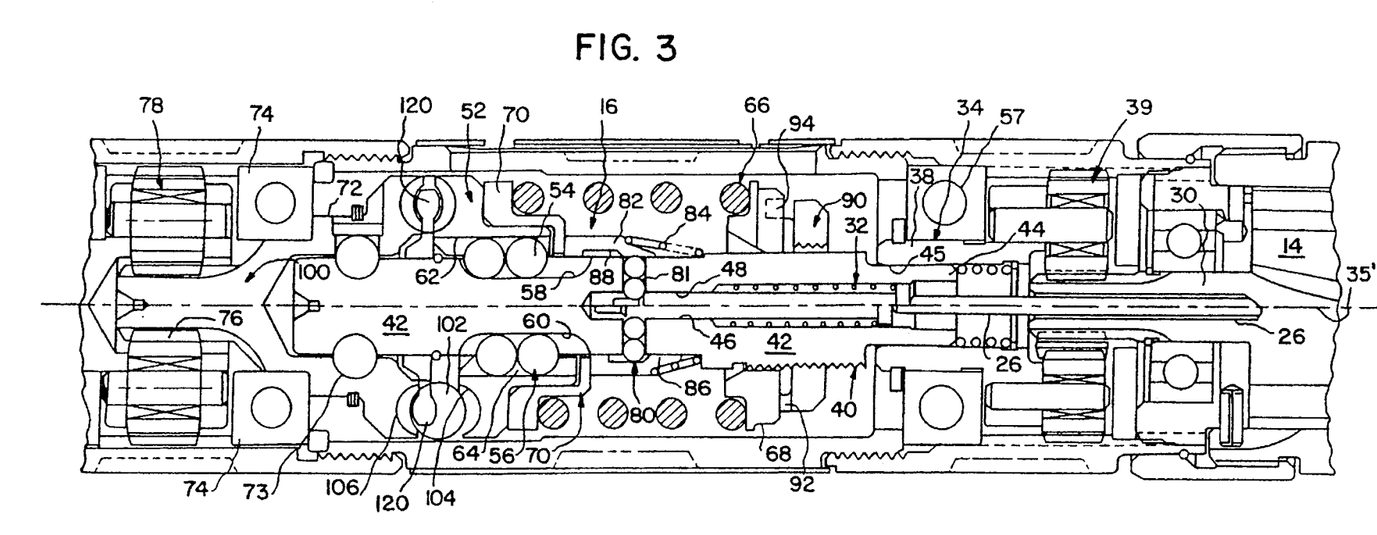
FIG. 3 is an enlarged side view, partly broken away, showing a portion of the tool of FIG. 1 featuring this invention wherein two longitudinal half sections show different sequences of an operating cycle.

An inlet end of an elongated tool housing, generally designated 18, has an air supply passage 20 downstream of an inlet coupling 22 and a throttle valve 23. An inlet or shut-off valve 24 is shown mounted on an end of a push rod 26 for movement toward and away from a valve seat 28 in the supply passage 20 which will be understood to lead to motor compartment 30. The push rod 26 and shut-off valve 24 are best shown in FIGS. 2 and 3 as being biased toward a normally open position by a coiled return spring 32.

A drive connection is provided between a rotary drive input 34 operated by the motor 12 and a tool drive 35 (FIG. 1) at a rotary output 36 of the tool 10 by the clutch torque control 16. Bearings 37 support spindle 38 for rotation about a major longitudinal axis 35' of housing 18 (FIG. 3). Spindle 38 is drivingly connected through a conventional gear train 39 to a driving clutch part 40 of the clutch torque control 16 (FIG. 2). Clutch part 40 includes a clutch shaft 42 having a hollow coaxially aligned, reduced hex shank 44 centrally disposed and rotatably supported within the confines of housing 18 in driving engagement within a hex output opening 45 of the output spindle 38 of gear train 39.

Push rod 26 extends axially into that hollow shank 44 of clutch shaft 42 into engagement with an enlarged end of a coaxially aligned shut-off pin 46. Pin 46 is received within an axial bore 48 of the clutch shaft 42 and has a shoulder 46' (FIG. 2) adjacent its reduced terminal end on the left of the shut-off pin 46 as viewed in the drawing. Shut-off pin 46 is continuously urged into engagement with the push rod 26 (to an extent limited by an annular stop 47 fixed within shank 44) by the above noted spring 32 having opposite ends seated against an internal shoulder of bore 48 and against an inside face of the enlarged end 50 of the shut-off pin 46 (FIG. 2).

For transmitting torque to input cam 52 of clutch torque control 16, a plurality of balls such as at 54 and 56 (FIGS. 1 and 3) are received in longitudinally extending slots 58 and 60 equally spaced apart on the surface of clutch shaft 42 and in corresponding recesses such as at 62 and 64 formed on an inside surface of the input cam 52 which is illustrated as being mounted on the clutch shaft 42 for axial reciprocating movement. Input cam 52 is normally maintained in its position illustrated in FIG. 2 and in the upper half section of FIGS. 1 and 3 by a coiled clutch spring 66 having opposite ends seated against an adjustable lock ring 68 and a retainer 70 mounted between an end of the coiled clutch spring 66 and the input cam 52. As fully described below, input cam 52 transmits torque to an output cam 72. Output cam 72 is maintained in axially fixed relation to the clutch shaft 42 in the illustrated embodiment by balls 73 fitted into corresponding recesses. Output cam 72 is shown mounted on an end of clutch shaft 42 and rotatably supported thereon within suitable bearing ball assemblies 74 mounted within clutch housing 18. The output cam 72 has an outboard splined shank 76 in meshing engagement with gears of a suitable gear train 78 leading to rotary output 36 of tool 10.

Figure 4A:
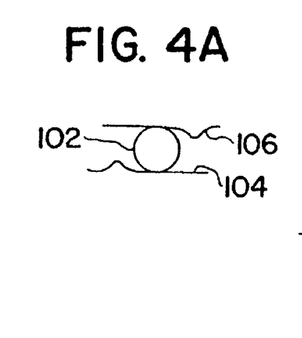
Figure 4B:
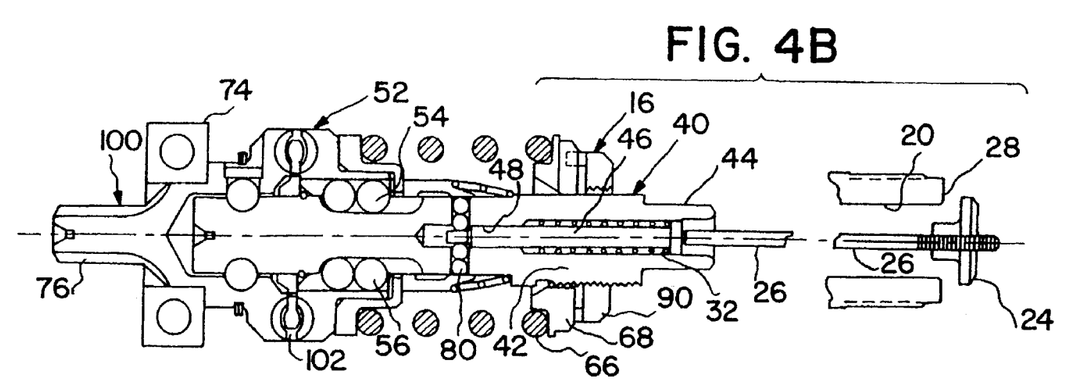

When tool 10 is inoperative with its throttle lever 11 (FIG. 1) released, the throttle valve 23 is closed and shut-off valve 24 is open as shown on the upper half section of FIG. 1 and also in FIG. 4b. This condition of the shut-off valve 24 normally is maintained by sprint; 32, and the shut-off pin 46 is releasably held at its shoulder 46' (as best seen in the upper half section of FIG. 3) by a plurality of balls such as at 80 stacked in transverse bores 81 of the clutch shaft 42. Thus, shut-off valve 24 is open and this condition is normally maintained through the balls 80 on shut-off pin 46 by a sleeve 82. The latter is coaxially mounted on the clutch shaft 42 and is continuously urged into engagement with retainer 70 by a suitable spring 84 seated between a radial flange of the clutch shaft 42 and a radial shoulder of the sleeve 82. Sleeve 82 has a collar 86, an inner surface of which is mounted on the clutch shaft 42 and is normally engaged with an outer ball of each stack of balls 80 within bores 81 to maintain them in engagement with shoulder 46' of the shut-off pin 46 to maintain the shut-off valve 24 in its open position. An annular recess 88 (is formed) on the interior of the sleeve 82 adjacent its ball-engaging collar 86.

To establish a preset output torque to be applied to a fastener, not shown, a spring force is provided by the coiled compression clutch spring 66. That spring force is preferably adjustable. To this end, the input end of the rotary driving clutch pan 40 includes an adjustment nut 90 (see FIGS. 2 and 3) threadably engaged with an externally threaded portion of clutch shaft 42. Nut 90 is maintained in a selected axial position on that shaft by lugs 92, extending about a peripheral edge of an inside face of the adjustment nut 90, which lugs 92 engage detent locking balls such as illustrated at 94 on a confronting face of lock ring 68. The lock ring 68 is preferably provided with a pair of internal linear shoulders partially defining a central opening of the lock ring 68 for engaging a flat 98 on clutch shaft 42 for maintaining the lock ring and adjustment nut 90 against undesired rotation relative to that clutch shaft 42. Accordingly, to precisely establish a desired preset fastener applied torque, the spring force applied to the input cam 52 of the driving clutch part 40 is readily adjusted by virtue of the above described structure.

To achieve torque control of increased accuracy by minimizing sliding motion and consequent friction between torque transmitting components of the clutch torque control 16 while also increasing the durability of its driving and driven clutch parts 40 and 100, the input and output cams 52, 72 are specifically configured and provided with clutch balls of equal size, such as shown at 102, to transmit torque in a unique clutch structure. In the specifically illustrated embodiment of this invention, the input and output cams 52, 72 each have complementary annular races 104, 106 in confronting relation to one another and a clutch ball 102 is disposed within the races 104 and 106 between adjacent pairs of lobes such as at 108 and 110 which are equally circumferentially spaced apart. The clutch balls 102 thus cooperate with the lobes 108, 110 when normally establishing a releasable drive between the drive input 34 and drive output 36 and impart relative movement between the driving and driven clutch pans 40 and 100 when the preset output torque is reached as established by the previously described coiled clutch spring 66 to trigger a tool shut-off action.

Figure 5A:
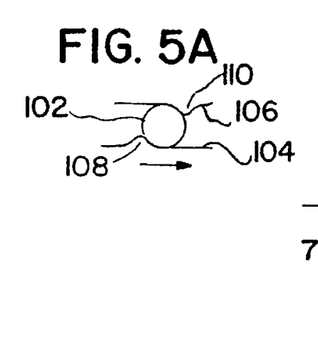
Figure 13:
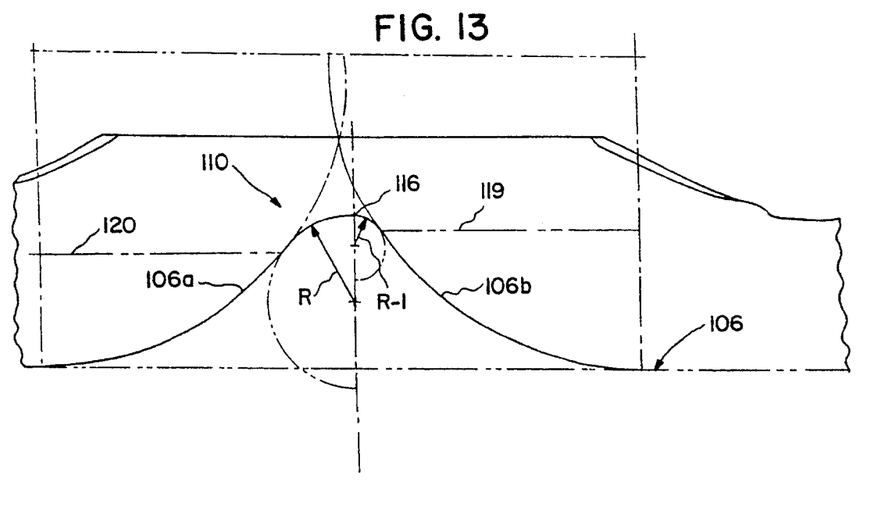
FIG. 13 is an enlarged view taken generally along line 13—13 of FIG. 12.
Figure 14:
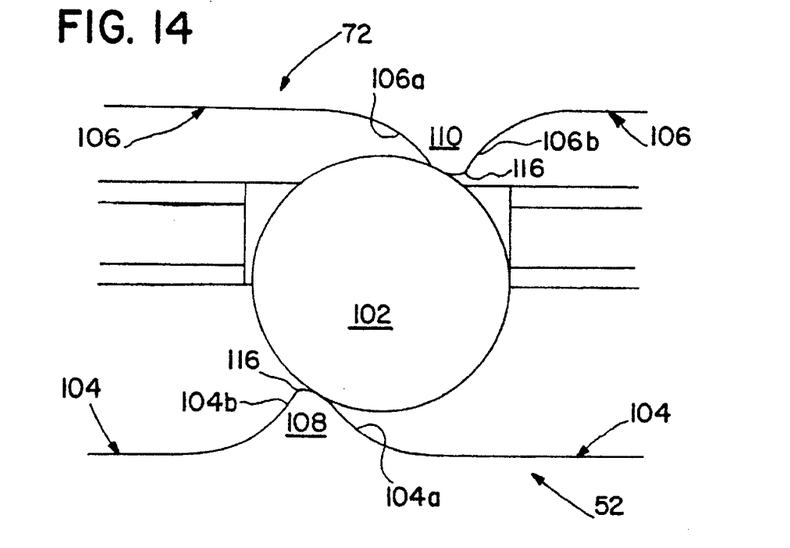
FIG. 14 is an enlarged schematic view of selected clutch drive components of the clutch torque control of this invention.

In the cam profile design of this invention, the cam profile transmits a preset torque when each of the clutch balls 102 are in a so-called base position (shown in FIG. 5*a*) in engagement with cam lobes 108 and 110. The sloping ramps 104*a*, 104*b* and 106*a* and 106*b* of each cam lobe 108, 110 (FIG. 14) each rise to a peak 116, formed by different size radii R and R-1 (FIG. 13), wherein matching cam peaks 116, 116 on the input and output cams 52 and 72 provide unstable platforms such that the clutch balls 102 roll between matching cam peaks 116, 116 and into a position in the confronting races 104, 106 between a following pair of adjacent lobes 108, 108 and 110, 110 responsive to relative rotation of the driving and driven clutch parts 40 and 100, thus releasing the drive therebetween and actuating the shut-off mechanism responsive to the drive output 36 reaching the preset output torque.

Figure 10:
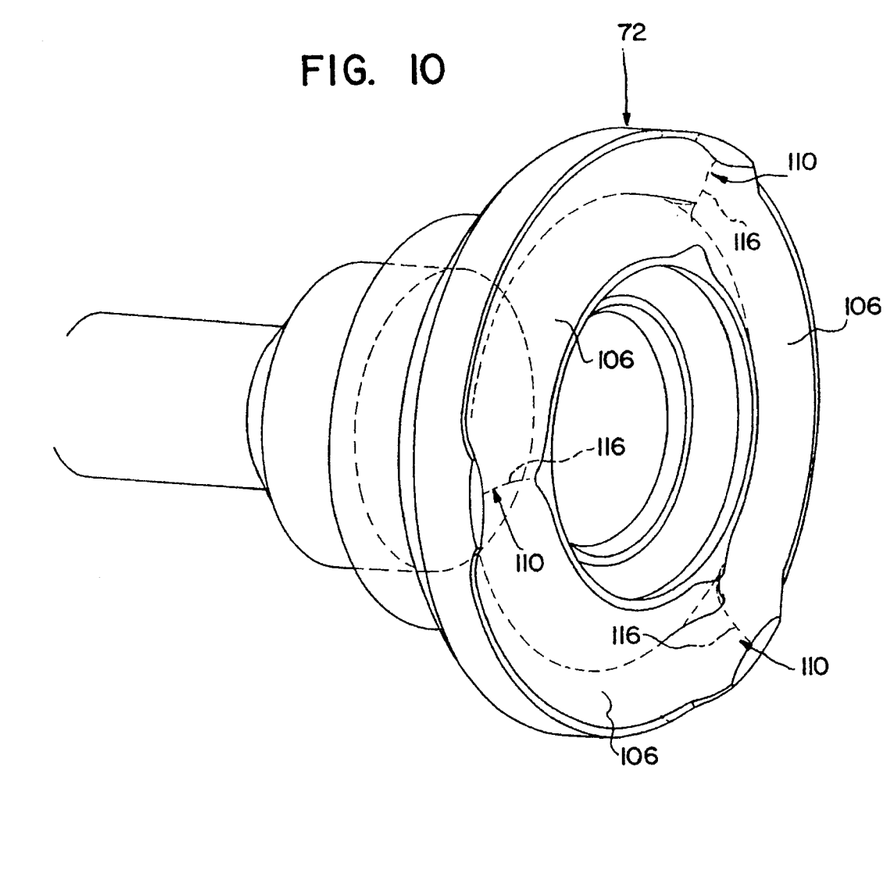
FIG. 10 is an enlarged isometric view of an output cam of a driven clutch part of the clutch torque control of this invention.
Figure 11:
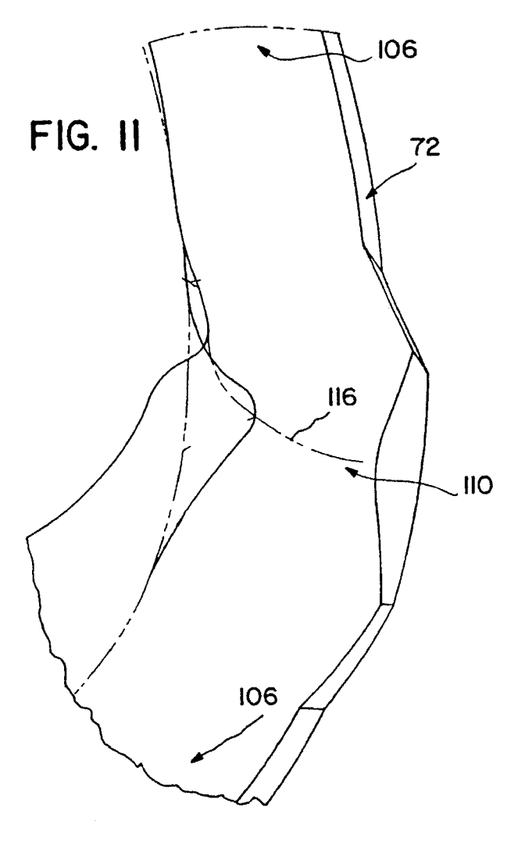
FIG. 11 is an isometric view, partly broken away, on a yet further enlarged scale showing details of a cam profile of the driven clutch part of FIG. 10.
Figure 12:
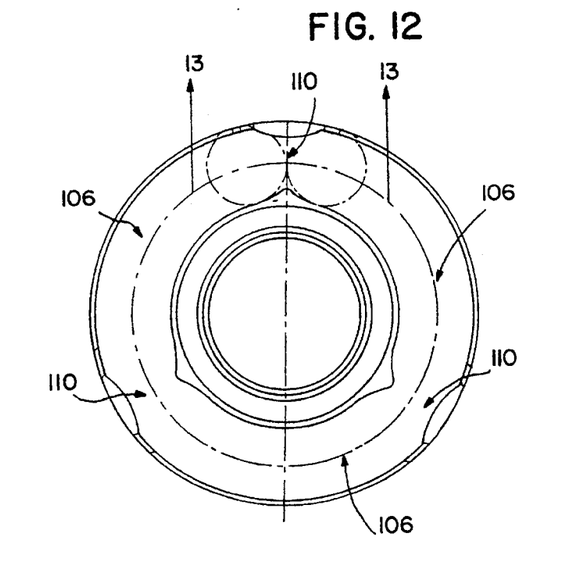
FIG. 12 is an end view of an output cam of a driven clutch part of the clutch torque control of this invention.

As best seen in FIG. 10 and in accordance with this invention, the annular races 104, 106 of the input and output cams 52, 72 each have an arcuate cross-section providing a concave contour for retaining the clutch balls 102 radially within the confines of the races 104, 106. The ramps of each cam lobe 108, 110 preferably include a leading ramp such as illustrated at 104*a* and 106*a* and a following ramp at 104*b* and 106*b* (FIGS. 13 and 14) having peaks respectively defined by radii R and R-1 (above reference lines 120, 119 of FIG. 13) wherein the following ramp 104*b* and 106*b* of each cam lobe 108, 110 is defined by a peak radius R-1 of shorter length than that of the peak radius R of its leading ramp. Thus, drive torque applied by the clutch torque control 16 of this invention to overcome turning resistance exerted on the drive output 36 by a given fastener may be greater in one angular direction (from right to left as viewed in FIG. 13) for loosening a fastener than that required for tightening it in an opposite angular direction (from left to right as viewed in FIG. 13).

Figure 15:
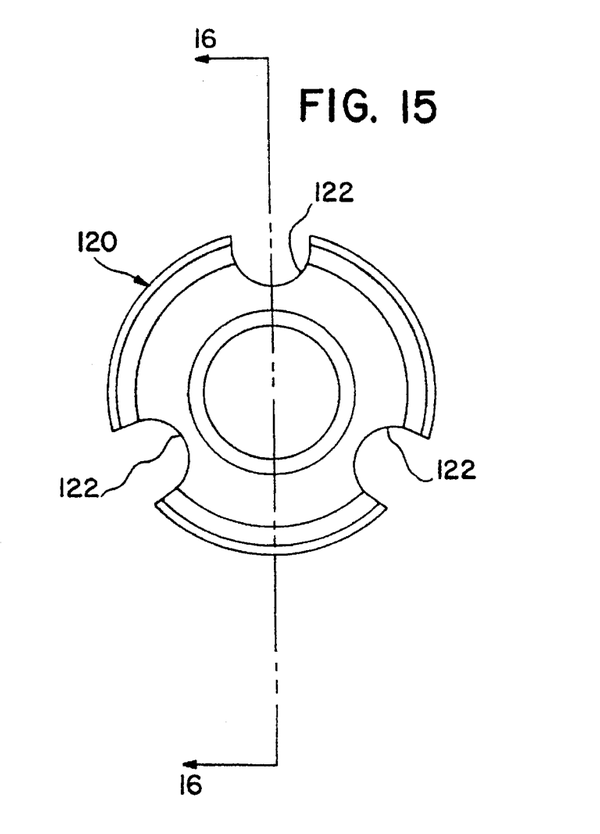
FIG. 15 is a plan view showing a ball separator of the clutch torque control of this invention.
Figure 16:
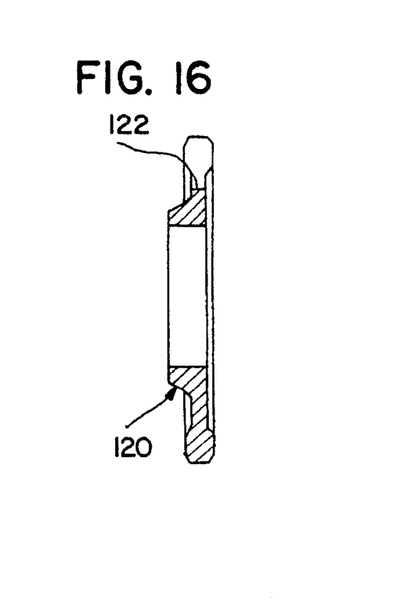
FIG. 16 is a sectional view taken generally along line 16–16 of FIG. 15.

To maintain the clutch balls 102 in equally spaced apart relation in confronting races of the input and output cams 52 and 72, a ball separator ring 120 (FIGS. 15 and 16) is preferably provided and is mounted between the cams 52, 72. While the number of clutch balls 102 may vary, depending upon the type tool in which the clutch torque control of this invention is used, three equally spaced peripheral recesses are shown at 122 in the ball separator ring 120 of the illustrated embodiment (see FIGS. 15 and 16) for receiving and maintaining three clutch balls 102 provided therein.

Figures 7A, 7B:
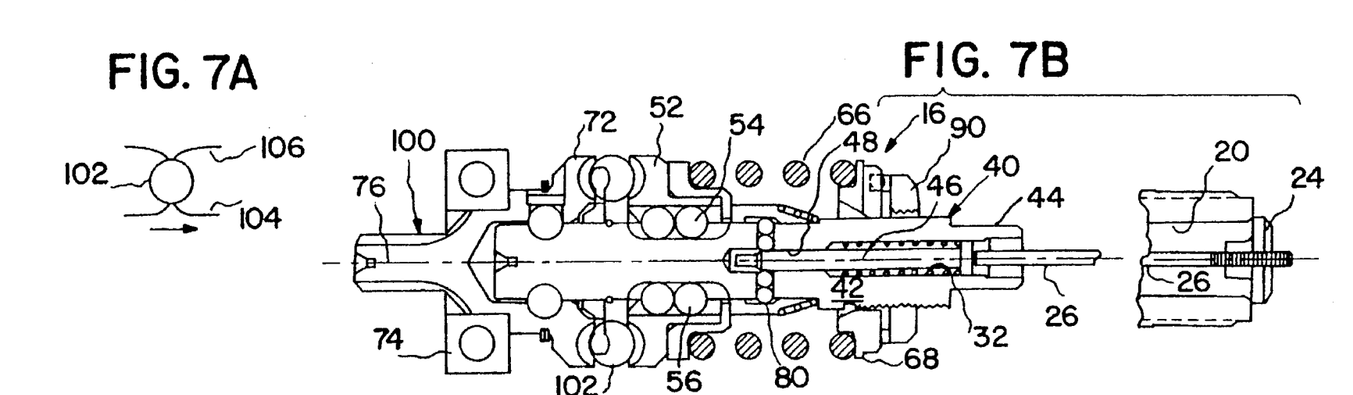

To minimize wear and to further reduce undesirable effects of any wear that may occur at the peaks 116, 116 of the cams 52, 72, the cam profiles are designed to transmit the preset torque in the above mentioned base position (FIG. 5*a*) and before the balls 102 roll between peaks 116 of the cams (FIGS. 7*a*, 7*b*), such that the torque applied by the drive output 36 to a fastener begins to drop upon rolling movement of the clutch balls 102 from the base position relative to the input and output cams 52, 72.

More specifically, to prevent axial movement of the input cam 52 before the preset torque is transmitted, the ramps 104*a*, 106*a* and 104*b*, 106*b* are dimensioned and configured such that clutch balls 102 preferably are in point contact engagement with cam peaks at radius R or R-1 when clutch balls 102 are in base position. Thus, when the preset torque is transmitted, clutch balls 102 then simply roll over the peaks 116, 116 of cam lobes 108, 110.

Figure 5B:
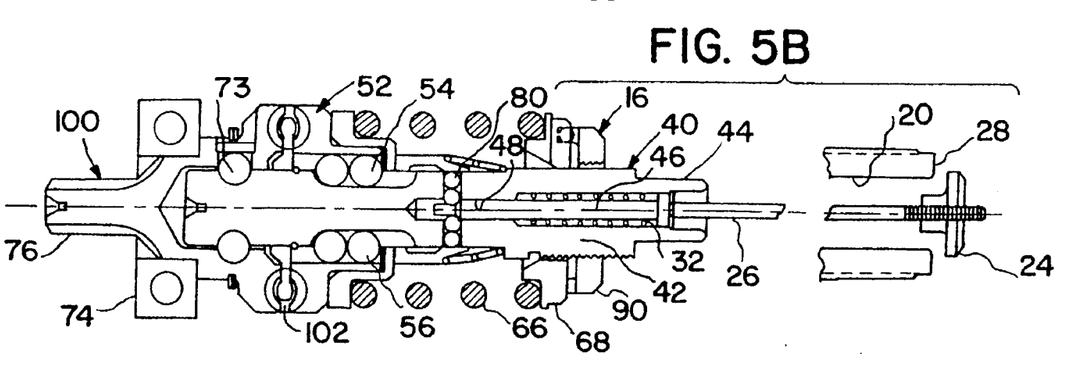
Figure 6A:
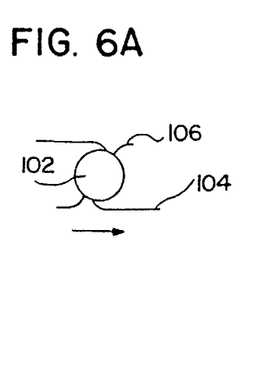
Figure 6B:
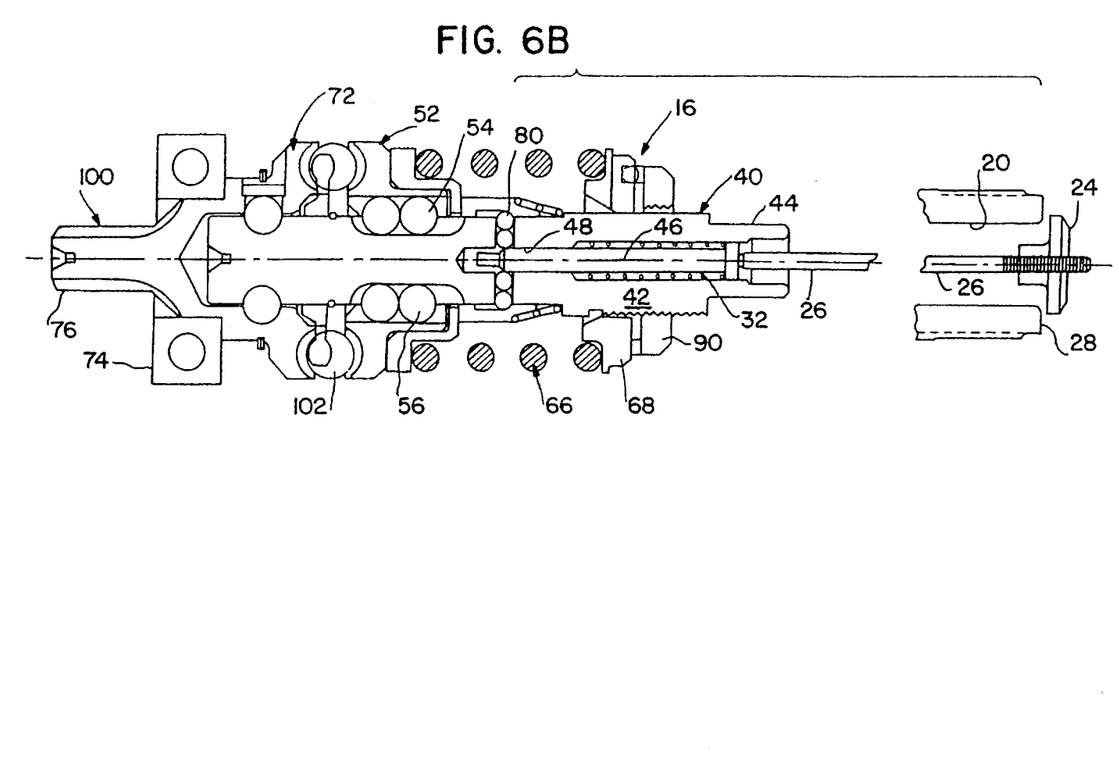
Figures 8A, 8B:
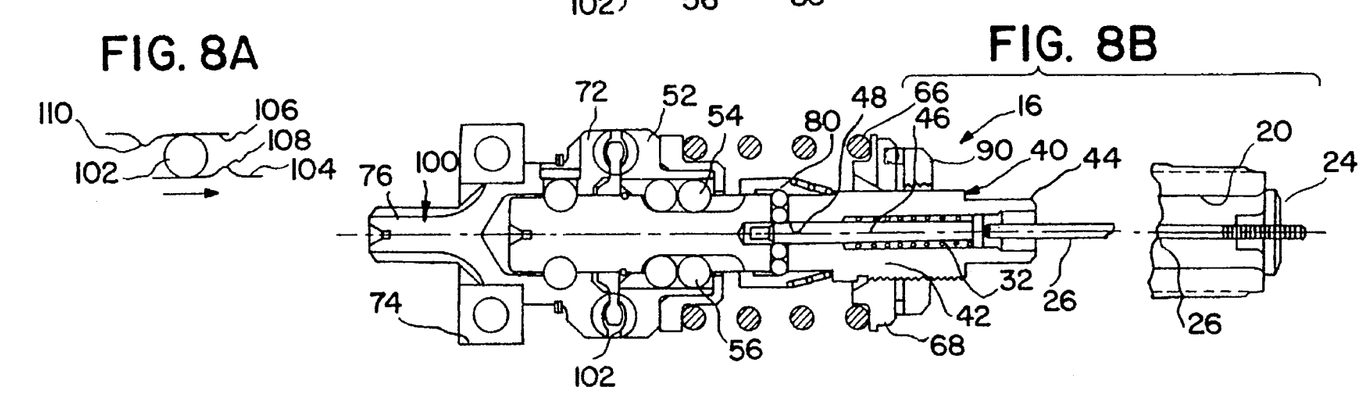

It will be seen that by virtue of the above described structure, the input and output cams 52 and 72 provide a clutch drive which maximizes torque before input cam 52 rolls the clutch balls 102 over matching peaks 116 (see FIGS. 8*a*, 8*b*) of the input and output cam lobes 108, 110. Accordingly, upon opening throttle valve 23 (FIGS. 5*a*, 5*b*), torque is transmitted through clutch torque control 16. Thereafter, the shut-off valve 24 is released after the clutch torque control 16 reaches the preset output torque (FIGS. 6*a* and 6*b*). As the clutch balls 102 reach the unstable matching peaks 116 between the cams (FIGS. 7*a* and 7*b*), output torque is at zero and a maximum axial displacement throw of the input cam 52 is effected, which is to the right as viewed in FIG. 3, during clutch release for actuating the shut-off mechanism. A concomitant axial displacement of the sleeve 82 permits its interior recess 88 to register with the bores 81 containing the balls 80 to permit their being moved radially outwardly to release the shut-off pin 46. This action permits closure of the shut-off valve 24 which is urged into closed position (FIGS. 7*b* and 8*b*) by a small difference in air pressure across that valve 24. The clutch balls 102 move over the following ramps 104*b* and 106*b* (FIGS. 8*a* and 14) into the following races 104, 106 between the next adjacent pairs of cam lobes 108, 108 and 110, 110, and clutch spring 66 effects a return of the input cam 52 to the left as viewed in. he drawing figures.

Figure 9A:
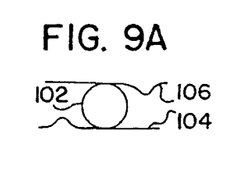
Figure 9B:
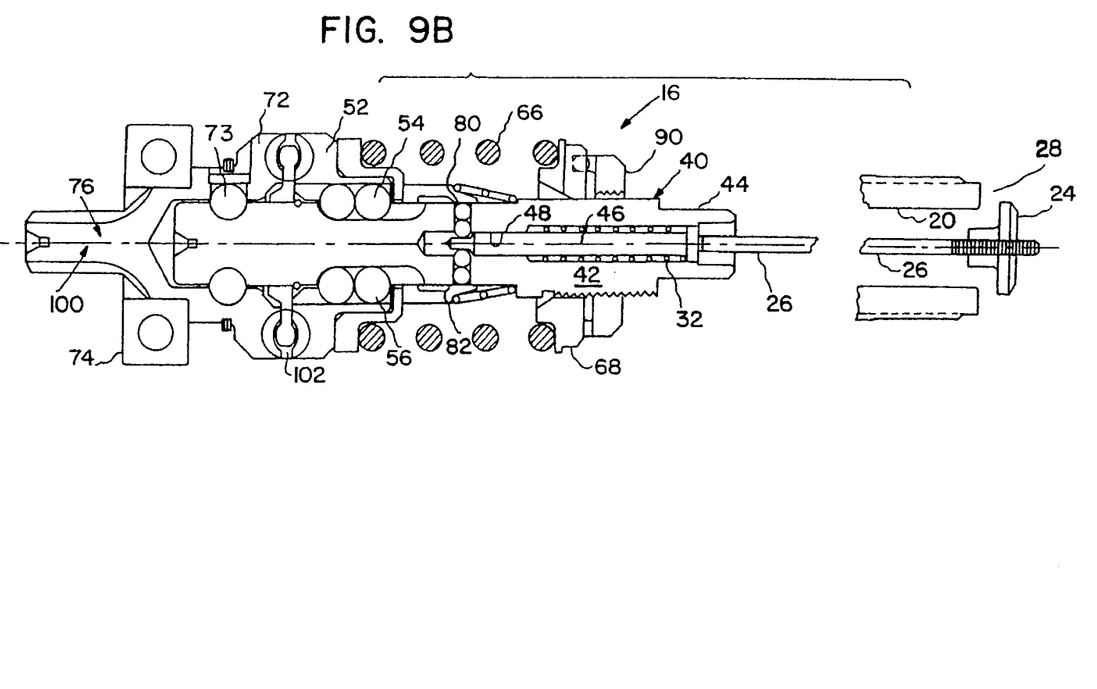

Upon throttle valve release (FIGS. 9*a* and 9*b*), the sleeve 82 and shut-off valve 24 are reset under the force of springs 84 and 32, respectively, which moves sleeve 82 to the left and the shut-off pin 46 to the right into open position as viewed in FIG. 3 in condition for the next operating cycle.

While certain embodiments of the present invention have been described in detail, that is for the purpose of illustration, not limitation.

What is claimed is:

1. In a power tool having a motor, a rotary drive input operated by the motor, a rotary drive output for driving a fastener, and a shut-off mechanism for interrupting power to the motor, a clutch torque control comprising rotary driving and driven clutch parts respectively drivingly connected to the drive input and drive output, resilient means exerting a biasing force continuously urging the driving and driven clutch parts toward one another, the driving clutch part and the driven clutch part being relatively axially movable against the force exerted by the resilient means and coaxially rotatable relative to one another, the driving and driven clutch parts including input and output cams each having complementary annular races in confronting relation to one another, the races of the cams including a like plurality of equally circumferentially spaced lobes, a clutch ball disposed within the races and between each adjacent pairs of lobes, the clutch balls cooperating with the lobes for normally establishing a releasable drive between the drive input and drive output and providing relative movement between the driving and driven clutch parts at a preset output torque established by the resilient means, the lobes each having a peak and cam ramps rising to its peak, the lobes being dimensioned and configured with profiles such that the lobes of the input cam are engageable with the clutch balls for rolling them simultaneously between matching cam peaks responsive to relative rotation of the clutch parts to axially displace the driving and driven clutch parts relative to one another against the biasing force of the resilient means for releasing the drive between the clutch parts and actuating the shut-off mechanism responsive to the drive output reaching said preset output torque, the clutch balls, upon engagement with a cam lobe, being disposed in the races in a base position, the clutch balls in base position being operative for transmitting said preset torque prior to relative axial movement of the driving and driven clutch parts, and the cam lobes being dimensioned and configured such that each of the clutch balls are in engagement with a peak of a cam lobe in said base position of the clutch balls prior to rolling over the cam lobes after said preset torque is transmitted.

2. In the power tool of claim 1 wherein the matching cam peaks provide unstable platforms for the clutch balls causing them to roll over the matching cam peaks and into a position between a following pair of adjacent lobes for conditioning the clutch torque control for a subsequent operating cycle.

3. In the power tool of claim 1 wherein the annular races of the input and output cams each have an arcuate cross-section providing a concave contour for retaining the clutch balls radially within the confines of the races.

4. In the power tool of claim 1 wherein each cam lobe includes a leading ramp portion and a following ramp portion, the peak of each cam lobe being defined by first and second radii merging with the leading and following ramp portions respectively, wherein the first radius of the peak merging with the leading ramp portion is of greater length than that of the second radius of the peak merging with the following ramp portion, whereby drive torque applied by the clutch torque control to overcome turning resistance exerted on the drive output by a given fastener is greater in one angular direction for loosening a fastener than that required for tightening it in an opposite angular direction.

5. In the power tool of claim 4 wherein the clutch balls upon being engaged with a cam lobe are disposed in a base position in a race and in point contact engagement with a peak of said cam lobe at a radius thereof for transmitting said preset torque prior to relative axial displacement of the driving and driven clutch parts.

6. In the power tool of claim 1 wherein the clutch balls between the input and output cams provide a clutch drive which maximizes torque applied to a fastener before the input cam rolls the clutch balls past the matching cam peaks of the input and output cam lobes.

7. In the power tool of claim 1 further including a ball separator ring mounted between the cams and having a plurality of equally spaced peripheral recesses for receiving and maintaining the clutch balls in equally spaced apart relationship in confronting races of the input and output cams.

8. In the power tool of claim 1 wherein the torque applied by the drive output to a fastener begins to drop upon rolling movement of the clutch balls towards the matching peaks of the input and output cam lobes.

9. In the power tool of claim 1 wherein the resilient means further includes an axially adjustable ring selectively mounted in coaxial fixed relation to the driving clutch part, and a spring means seated between the ring and the input cam of the driving clutch part for adjustably setting said predetermined output torque.

10. In the power tool of claim 1 wherein the input cam rolls the clutch balls over matching peaks of the input and output cam lobes to effect a maximum axial displacement throw of one of the driving and driven clutch parts relative to the other during clutch release for actuating the shut-off mechanism.

11. In the power tool of claim 1 wherein the driving clutch part is axially movable relative to the driven clutch part, the driving clutch part being coaxially rotatable both in unison with and relative to the driven clutch part.

* * * * *